United States Patent
Tong et al.

(10) Patent No.: US 10,897,501 B2
(45) Date of Patent: Jan. 19, 2021

(54) SERVER-BASED BACKUP SYSTEM FOR USER DATA

(71) Applicant: Google LLC, Mountain View, CA (US)

(72) Inventors: Darick M. Tong, Palo Alto, CA (US); Paul T. Buchheit, Los Altos, CA (US); Jing Yee Lim, Palo Alto, CA (US); Sanjeev Singh, South San Francisco, CA (US)

(73) Assignee: Google LLC, Mountain View, CA (US)

( * ) Notice: Subject to any disclaimer, the term of this patent is extended or adjusted under 35 U.S.C. 154(b) by 22 days.

(21) Appl. No.: 16/458,683

(22) Filed: Jul. 1, 2019

(65) Prior Publication Data

US 2019/0394268 A1 Dec. 26, 2019

Related U.S. Application Data

(63) Continuation of application No. 15/665,320, filed on Jul. 31, 2017, now Pat. No. 10,389,807, which is a continuation of application No. 14/538,550, filed on Nov. 11, 2014, now Pat. No. 9,736,237, which is a continuation of application No. 11/414,752, filed on Apr. 28, 2006, now Pat. No. 8,886,706, which is a continuation-in-part of application No. 11/172,700, (Continued)

(51) Int. Cl.
*H04L 29/08* (2006.01)
*G06Q 10/10* (2012.01)
*H04L 12/58* (2006.01)

(52) U.S. Cl.
CPC ....... *H04L 67/1095* (2013.01); *G06Q 10/107* (2013.01); *H04L 51/08* (2013.01); *H04L 51/22* (2013.01); *H04L 51/28* (2013.01)

(58) Field of Classification Search
CPC ..... H04L 67/1095; H04L 51/08; H04L 51/22; H04L 51/28; G06Q 10/107
See application file for complete search history.

(56) References Cited

U.S. PATENT DOCUMENTS 5,675,507 A 10/1997 Bobo
5,774,670 A 6/1998 Montulli
(Continued)

FOREIGN PATENT DOCUMENTS

EP 0886228 A2 12/1998

OTHER PUBLICATIONS

Bannan, E-mail with high performance, Sep. 23, 1996, 1 pg.
(Continued)

*Primary Examiner* — Philip J Chea
*Assistant Examiner* — Robert B McAdams
(74) *Attorney, Agent, or Firm* — Botos Churchill IP Law

(57) ABSTRACT

A host system sends a web page to a client system via a communications network, and receives inputs from the client system, via the communications network, that include user text inputs to the web page. The inputs are received without receiving from the client system, via the communications network, a user-initiated command that would require saving user inputs to the web page. The host system makes incremental changes to a backup copy of user inputs to the web page, stored at the host system, in accordance with the received inputs. In accordance with detection by the host system of a restart condition for the web page corresponding to prior closure of the web page at the client system, the host system sends the backup copy to the client system for presentation to a user of the client system.

20 Claims, 8 Drawing Sheets

Related U.S. Application Data filed on Jun. 30, 2005, now abandoned, which is a continuation-in-part of application No. 11/094,763, filed on Mar. 31, 2005, now Pat. No. 8,694,589.

(56) References Cited

U.S. PATENT DOCUMENTS

| | | | |
|---|---|---|---|
| 5,832,530 A | 11/1998 | Paknad et al. | |
| 6,101,482 A | 8/2000 | DiAngelo et al. | |
| 6,182,108 B1 | 1/2001 | Williams et al. | |
| 6,185,551 B1 | 2/2001 | Birrell et al. | |
| 6,327,544 B1 | 12/2001 | Samuels | |
| 6,330,566 B1 | 12/2001 | Durham | |
| 6,356,937 B1 | 3/2002 | Montville et al. | |
| 6,374,359 B1 | 4/2002 | Shrader et al. | |
| 6,385,529 B1 | 5/2002 | Minowa et al. | |
| 6,385,592 B1 | 5/2002 | Angles et al. | |
| 6,449,765 B1 | 9/2002 | Ballard | |
| 6,463,307 B1 | 10/2002 | Larsson et al. | |
| 6,557,038 B1 | 4/2003 | Becker et al. | |
| 6,701,454 B1 | 3/2004 | Fischer et al. | |
| 6,725,269 B1 | 4/2004 | Megiddo | |
| 6,774,921 B1 | 8/2004 | Tadman et al. | |
| 6,810,410 B1 | 10/2004 | Durham | |
| 6,811,490 B2 | 11/2004 | Rubin | |
| 6,836,895 B2 | 12/2004 | Hamlin | |
| 6,901,425 B1 | 5/2005 | Dykes et al. | |
| 6,950,980 B1 | 9/2005 | Malcolm | |
| 6,963,903 B2 | 11/2005 | Krueger et al. | |
| 7,010,546 B1 | 3/2006 | Kolawa et al. | |
| 7,010,605 B1 | 3/2006 | Dharmarajan | |
| 7,024,457 B1 | 4/2006 | Newman et al. | |
| 7,103,230 B1 | 9/2006 | Jam et al. | |
| 7,111,234 B2 | 9/2006 | Peck et al. | |
| 7,149,791 B2 | 12/2006 | Sears et al. | |
| 7,188,305 B1 | 3/2007 | Corbin et al. | |
| 7,288,305 B2 | 10/2007 | Perrier et al. | |
| 7,424,543 B2 | 9/2008 | Rice | |
| 7,634,688 B2 | 12/2009 | Madter et al. | |
| 2001/0042100 A1 | 11/2001 | Guedalia et al. | |
| 2002/0032743 A1 | 3/2002 | Lee et al. | |
| 2002/0103827 A1 | 8/2002 | Sesek | |
| 2002/0107885 A1 | 8/2002 | Brooks et al. | |
| 2002/0107886 A1 | 8/2002 | Gentner et al. | |
| 2002/0112010 A1 | 8/2002 | Soroker et al. | |
| 2003/0020744 A1 | 1/2003 | Ellis et al. | |
| 2003/0110445 A1 | 6/2003 | Khaleque | |
| 2003/0158776 A1 | 8/2003 | Landesmann | |
| 2003/0177447 A1 | 9/2003 | Newbury | |
| 2003/0182357 A1 | 9/2003 | Chess et al. | |
| 2004/0073667 A1 | 4/2004 | Hamilton et al. | |
| 2004/0078446 A1 | 4/2004 | Daniell et al. | |
| 2004/0117247 A1 | 6/2004 | Agrawal et al. | |
| 2004/0127232 A1 | 7/2004 | Kotzin | |
| 2004/0127241 A1 | 7/2004 | Shostak | |
| 2004/0128356 A1 | 7/2004 | Bernstein et al. | |
| 2004/0153973 A1 | 8/2004 | Horwitz | |
| 2004/0163020 A1 | 8/2004 | Sidman | |
| 2004/0168083 A1 | 8/2004 | Gasparini et al. | |
| 2005/0021570 A1 | 1/2005 | Thompson | |
| 2005/0050228 A1 | 3/2005 | Perham et al. | |
| 2005/0125715 A1 | 6/2005 | Di et al. | |
| 2005/0183003 A1 | 8/2005 | Peri | |
| 2005/0235034 A1 | 10/2005 | Chen et al. | |
| 2006/0031489 A1 | 2/2006 | Marcjan | |
| 2006/0036875 A1 | 2/2006 | Karoubi | |
| 2006/0075330 A1 | 4/2006 | Guido et al. | |
| 2006/0248442 A1 | 11/2006 | Rosenstein et al. | |
| 2008/0177994 A1 | 7/2008 | Mayer | |

OTHER PUBLICATIONS

Google, International Search Report and Written Opinion, PCT/US06/09630, dated Nov. 7, 2006, 4 pgs.

WebMail basics, ITS, Tennessee Technological Univ., May 2003, 8 pgs.

SERVER-BASED BACKUP SYSTEM FOR USER DATA

RELATED APPLICATIONS

The present application is a continuation of U.S. patent application Ser. No. 15/665,320, filed Jul. 31, 2017, which is a continuation of U.S. patent application Ser. No. 14/538,550, filed Nov. 11, 2014, now U.S. Pat. No. 9,736,237, which is a continuation of U.S. patent application Ser. No. 11/414,752, filed on Apr. 28, 2006, now U.S. Pat. No. 8,886,706, which is a continuation-in-part of U.S. patent application Ser. No. 11/172,700, filed on Jun. 30, 2005, and which is also a continuation-in-part of U.S. patent application Ser. No. 11/094,763, filed on Mar. 31, 2005, now U.S. Pat. No. 8,694,589, all of which are hereby incorporated by reference in their entireties.

FIELD OF THE INVENTION

The present invention relates generally to backup systems, and more specifically to an embedded archiving tool for backing up user-provided data on a server.

BACKGROUND

A wide variety of application programs may be executed on client computers. These include programs that are implemented in a client-server system using a network, such as the World Wide Web, which is also referred to as the Internet. These application programs offer users a broad array of functionality and help users perform complicated tasks and improve their overall productivity.

Backing up or storing current content that has been provided by users of application programs that are implemented on existing client-server systems, for example, as a locally stored saved-draft file, may be problematic. For example, the application programs may not have the necessary privileges to allow local storage of saved draft files on the client computers. And while saved-draft files may be stored on a server, waiting for a respective user to initiate such archiving may also be challenging. If a service error, such as a network or network interface failure, interrupts such an application program before the saved-draft file has been created, the current content provided by the respective user may be inadvertently lost.

There is a need, therefore, for an improved backup system for applications programs operating in client-server systems.

SUMMARY

A method of archiving content is described. A web page corresponding to an application program is transmitted to a client computer using a network. The web page includes instructions corresponding to an embedded archiving tool. The embedded archiving tool is to store content provided to the web page by a user. The content is stored on a server remotely located from the client computer when an archiving condition is satisfied.

The application program may include an electronic messaging program. The application program may include an email application, a text processor, a spread sheet application, a presentation authoring tool, a blog authoring tool, a webpage-based form for entering information to be stored in a server, a web-page authoring tool, and/or an advertising program registration tool. More generally, the method of archiving content, and the archiving tool, can be used in conjunction with virtually any application program that accepts user-edited information.

The archiving condition may be satisfied when at least a pre-defined time has elapsed since a previous instance of storing content on the server, when at least a pre-determined number of modifications to the content have occurred, and/or when a length of the content increases by at least a pre-defined amount.

The content may include the content of an electronic message and/or one or more attachments to an electronic message.

The storing may be delayed if the user has modified the content within at least a preceding time interval and/or if the user is currently attaching one or more attachments to the content.

The archiving condition may include closing of the application program and/or closing of a browser.

The stored content may be compressed using a compression algorithm and/or encrypted using an encryption algorithm.

The instructions in the web page may include performing the storing in response to the user activating a save icon. Storing of the content may include generating a store request, constructing content to be stored on the server (where the content to be stored corresponds to the content in the application program), and/or transmitting the content to be stored to the server. In some embodiments, a copy of the content on the client computer is generated when the store request is generated.

In some embodiments, the save icon in the web page is highlighted whenever the content includes any modifications not stored on the server, and the highlighting of the save icon is removed whenever the content is stored on the server.

In some embodiments, the copy of the content is compared to the content to be stored prior to the transmission of the content to be stored. The highlighting of the save icon may be removed only if the copy of the content and the content to be stored are equivalent.

In some embodiments, a content-saved message is displayed when the user re-starts the application program and/or the browser. In some embodiments, at least a subset of the stored content is reconstructed and presented to the user when a restart condition is detected.

In another embodiment, a web page corresponding to an application program is received at a client computer using a network. The web page includes executable instructions corresponding to an embedded archiving tool. The embedded archiving tool is to store content provided to the web page by a user. The content is stored on a server remotely located from the client computer when an archiving condition is satisfied.

One or more embodiments may be implemented as a computer readable storage medium that includes an embedded computer program mechanism. In another embodiment, a computer may include memory, a processor and a program for archiving content. The program for archiving content may correspond to one or more embodiments. The program may be stored in the memory and executed by the processor. In other embodiment, information corresponding to one or more embodiments may be communicated between a server and a client computer using a network.

The challenges associated with existing archiving approaches may be reduced and/or eliminated by the aforementioned embodiments.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS

Figure 1:
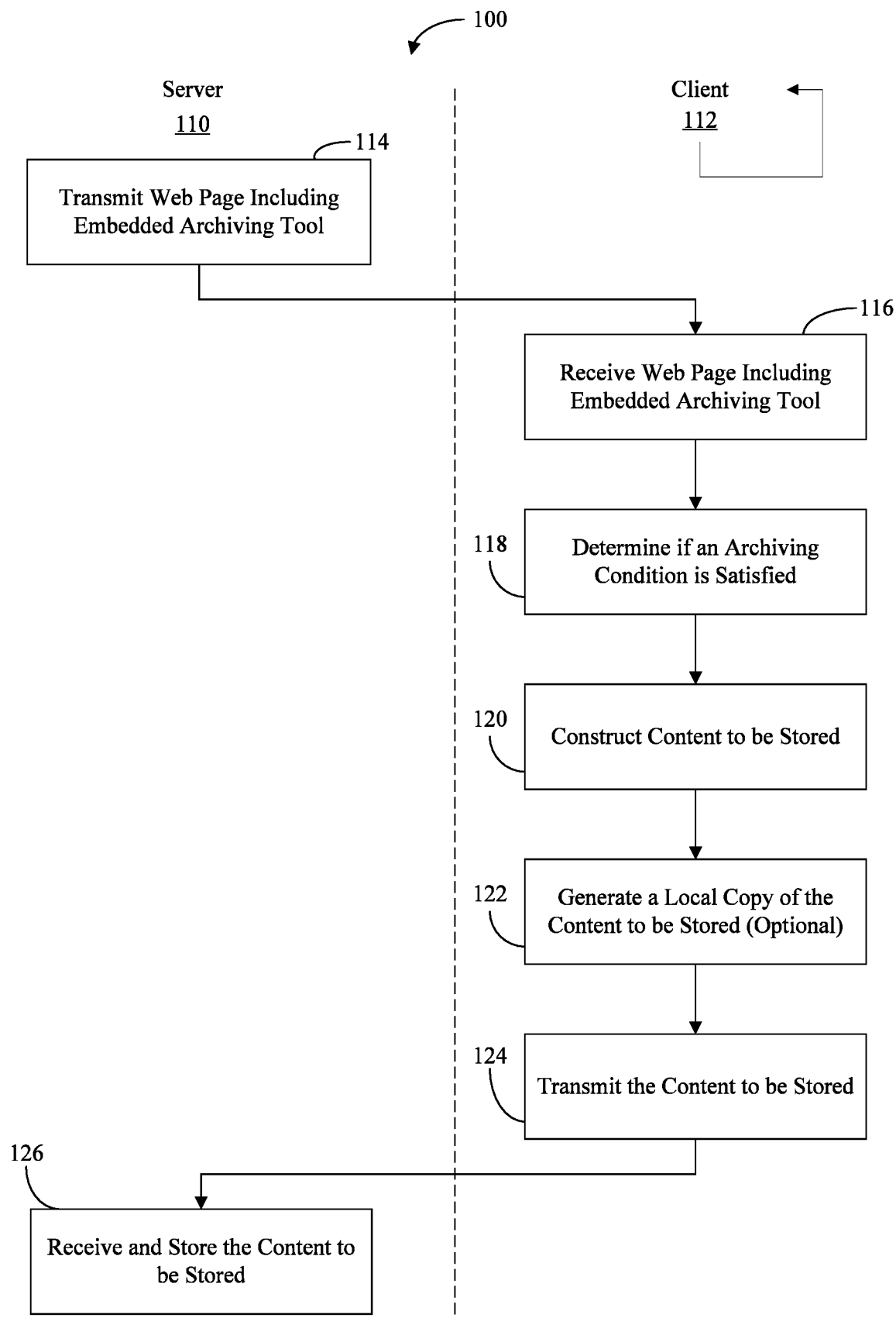
FIG. 1 is a flow diagram illustrating an embodiment of interaction between a client and a server.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

A system and method of archiving user content is disclosed. In some embodiments, an archiving tool is embedded in web-page instructions transmitted from a server to a client computer using a network, such as an intranet and/or the Internet, which is also referred to as the World Wide Web (WWW). When the web-page instructions are rendered by a browser (such as Netscape Navigator™, Internet Explorer™, Firefox™ or Safari™) or a standalone program that displays a structured document such as a web page on the client computer, the embedded archiving tool may be used to archive content provided by the user to an application program via the web page. Thus, the embedded archiving tool may execute in the browser environment, which in this context functions as a virtual machine.

The application program may be implemented in a client-server system. The application program may include an electronic messaging program. In some embodiments, the application program may include an email application, a text processor, a spread sheet application, a presentation authoring tool, a blog authoring tool, a webpage-based form for entering information to be stored in a server, a web-page authoring tool, and/or an advertising program registration tool. More generally, the method of archiving content, and the archiving tool, can be used in conjunction with virtually any application program that accepts user-edited information. The embedded archiving tool may be written in JavaScript™ (a trademark of Sun Microsystems, Inc.), ECMAScript (the specification for which is published by the European Computer Manufacturers Association International), VBScript™ (a trademark of Microsoft, Inc.) and/or any other client-side scripting language. In other words, the embedded archiving tool includes programs or procedures containing JavaScript, ECMAScript instructions, VBScript instructions, or instructions in another programming language suitable for rendering by the browser or another client application.

The embedded archiving tool may store content provided to the web page and/or the application program by a user. The content may include the content of an electronic message and/or one or more attachments to an electronic message. The content may be stored on a client computer and/or on a server computer located remotely from the client computer. The storing may include creating or updating one or more archive files. The storing of at least a portion of the content may occur when an archiving condition is satisfied. The archiving condition may include when a user provides or changes the content (for example, after a character is typed on a user interface device such as a keyboard) and/or after a pre-determined time interval (for example, a few seconds, a few tens of seconds or a few minutes) since the user started providing or changing the content. In some embodiments, the archiving condition may be satisfied when a user activates a save icon in the application program, when at least a pre-defined time has elapsed since a previous instance of storing the content (for example, if more than 2 minutes have elapsed since the most recent instance of storing), when at least a pre-defined time has elapsed since a previous instance of modifying the content (for example, if more than 2 minutes have elapsed since the most recent instance of modifying the content), when at least a pre-determined number of modifications to the content have occurred (for example, 100 modifications), when a length of the content increases by at least a pre-defined amount, and/or when the application program and/or browser is closed. For example, the archiving condition is satisfied after 2 minutes since a most recent modification of the content or 100 modifications (e.g., the addition or deletion of 100 characters), which ever comes first.

In some embodiments, periodic updates to the archive files may be made whenever the user has entered any new content or has modified any of the previously entered content. In some embodiments, the storing may be delayed if the user has modified the content within at least a preceding time interval. For example, if the user has modified the content in the last 2 seconds the storing may be delayed by 2 seconds to prevent archiving while the user is modifying the content. In some embodiments, the storing may be delayed if the user is currently attaching one or more attachments to the content. In some embodiments, a timer that is tracking an elapsed time since a most recent instance of storing may be suspended while the user is attaching an attachment.

In some embodiments, the one or more archive files may be initially stored on the client computer and at least a subset of the content stored in the one or more archive files may be subsequently stored on the server. In these embodiments, a corresponding subset of the content that was previously stored on the client computer (in the one or more archive files) may be erased, deleted or overwritten when at least the subset of the content is stored on the server. In some embodiments, the one or more archive files may be stored on the client computer and on the server. From a general viewpoint, the archiving tool uses archive files to store user-provided content that may be needed by the user in the future. When user-provided content or information is no longer needed by the user, the content or information in one or more archive files, on the client computer and/or the server, may be deleted.

When the user has completed providing the content to the application program (for example, a final version of the content is provided) and the user instructs the application program that he or she is finished (for example, the user hits a send button or icon in an email application program), the one or more archive files stored on the client computer and/or the server may be deleted, erased or overwritten. In some embodiments, the one or more archive files may expire, and may be deleted, erased or overwritten, after a certain amount of time (e.g., 24 hours, 168 hours, or a month) has elapsed since the one or more archive files were created or last updated.

The browser may keep track of which archive files exist and/or which archive files have been created. If the application program and/or the browser is shut down, either intentionally or unintentionally, or communication with the application program and/or the browser is temporarily disrupted (for example, due to a network failure), the one or more archive files may be used to reconstruct and present at least some of the content to the user. For example, if the user restarts the application program (for example, the user attempts to download a web page associated with the application program) and a presence of the one or more archive files is detected, a restart condition is detected and at least some of the content is reconstructed and presented to the user. In some embodiments, the content may be reconstructed on the client computer. In other embodiments, the content may be reconstructed on the server. In other embodiments, the content may be partially reconstructed on the client computer and partially reconstructed on the server. For example, during a restart one or more locally stored archive files may be sent to the server and the server may return a web page or instructions for a web page including the content that was stored in the one or more archive files and/or content that was stored on the server.

In some embodiments, the deletion of the archive files may not take place until the server positively notifies the client code that the save action has completed successfully. This may happen, for example, when the client issues its next request to the server.

In some embodiments, the one or more archive files may include cookie files or cookies. The cookie files may include the content provided by the user and/or the user data. The cookie files may be stored locally, i.e., on the client computer. In some embodiments, some or all of the content stored on the server may be stored on the server as cookie files and/or using another file format.

Typically, cookie files are computer-generated files that are issued to the client computer by a "cookie server," i.e., a host server, associated with a universal resource locator (URL) either before or while the URL is electronically contacted by the client computer. While cookie files are typically created by a host server, cookie files can also be created and/or updated by a client. For example, the embedded archiving tool may create and store a cookie file directly in a cookie cache of the client computer. The cookie files are transparent and may be automatically enabled by an operating system (such as WINDOWS) without special security privileges. In addition to user cookies, archive files may be implemented using "userData" stores or objects, and other types of data storage files, objects and the like. The term "cookie file" is sometimes used in this document to mean any type of archive file that is used to store user data or backup data associated with a web page or network-implemented application.

As noted above, the one or more cookie files, and more generally, the archive files, may be generated locally by the embedded archiving tool in a web page. Alternatively, the one or more cookie files and/or archive files may be generated on the server, i.e., the content may be transmitted to the server and the corresponding one or more cookie files and/or archive files may be generated. The resulting cookie files and/or archive files may be stored on the server and/or transmitted back to the client computer for local storage. In some embodiments, cookie files and/or archive files may be stored in memory in the client computer (such as cookie cache) or in data structures other than traditional files, such as records in a database.

Typically, the browser restricts cookie files based on a name space (such as an Internet protocol address or domain name). As a consequence, in embodiments where the archive files include cookies, the embedded archiving tool may assign a domain name or URL to a respective cookie. In some embodiments, the domain name or URL in the respective cookie may be fictitious, i.e., the domain name or URL may only have meaning to the embedded archiving tool. The one or more cookie files may also include time stamps corresponding to when the content was archived and/or position or location information. The latter may be useful for application programs that have multiple fields in a window or a browser window. (A "window" or "browser window" comprises a virtual graphical display area for viewing a web page, HTML file, extensible markup language or XML file, or the like. A "window" typically corresponds to a "tab" or "window" or the like in various browser programs.)

Depending on a size of the content, one or more archive files may be used by the embedded archiving tool. (For example, typically, cookie files are restricted to a size of 4 kilobytes.) In some embodiments, additional content is appended to one or more of the archive files, as needed, during archiving. During reconstruction, the embedded archiving tool and/or code executed on the client computer and/or the server may stitch the one or more archive files together and/or arrange corresponding content in an appropriate temporal order or relative spatial position (for example, in a "window").

To help reduce a size of one or more archive files, in some embodiments at least a portion of the content may be compressed using a compression algorithm. In some embodiments, at least a portion of the content may be encrypted using an encryption algorithm. This may allow the privacy of the content to be protected, especially if the client computer is used by two or more users. Encryption may include symmetric encryption and/or public key encryption. In embodiments that include encryption, the server may provide a decryption key, as needed, by the embedded archiving tool.

In some embodiments, the archiving tool is added to a web page by inserting a single instruction (e.g., a JavaScript instruction) into the web page. The inserted instruction loads the archiving tool from the server into the client. In one version of this embodiment, the archiving tool is a general tool that is not specific to any particular web page. When loaded into the client, the tool examines the web page to identify the fields in which a user may enter content, and then tracks and stores content entered into those fields. In other versions, the archiving tool may be customized to a particular web page or family of web pages, so as to eliminate or simplify the task of identifying the fields of the web page in which a user may enter content.

While the preceding discussion described embodiments where the archiving tool is embedded in a web page, in other embodiments the archiving tool may be resident or installed on the client computer.

Attention is now directed towards embodiments of an embedded archiving tool for backing up user-provided data. FIG. 1 is a flow diagram illustrating an embodiment of an information archiving method 100 for storing content, entered by a user into a web page or other online form at a client 112, on a server 110. A web page including an embedded archiving tool is transmitted (114) to the client 112. The web page including the embedded archiving tool is received (116) by the client 112. Whether or not an archiving condition is satisfied is determined (118). For example, a store icon may be activated by the user. In some embodiments, a store request may be generated when the archiving condition is satisfied. Content to be stored is constructed (120). A local copy of the content to be stored is optionally generated (122). The local copy may be optionally stored in one or more cookie files on the client 112. For example, the local copy of the content is optionally stored in one, two or more cookie files.

During normal operation, such as when the user performs an action that indicates completion of a web page form, or upon the occurrence of another event, information corresponding to the content is transmitted (124) to the server 110. In some embodiments, the information locally stored in one or more cookie files is transmitted to the server 110 when the amount of data stored in the one or more cookie files exceeds a predefined limit or threshold. For instance, this may be done to avoid exceeding a data storage limit associated with the cookie files, and to free up space to store more backup data.

The information corresponding to the content is received and stored (126) at the server 110. In some embodiments, the server 110 sends an acknowledgement of receipt of the information to the client 112. In some embodiments, the acknowledgement of receipt is not sent until the information has been successfully and durably stored by the server 110. Upon receiving the acknowledgement, the client 112 may delete one or more cookie files corresponding to the information that has been stored by the server. In some embodiments, the "acknowledgment" may be a cookie file deletion command sent by the server 110 to the client 112.

In some embodiments, an instance of operations 124 and 126 may not performed if the user or client 112 closes the web page prior to the content being transmitted to the server 110, or a failure or other event at the client 112 prevents the browser from sending the content to the server 110. When any such intervening event occurs, a recovery process is performed, as will be described below with respect to FIG. 2.

The information archiving method 100 may include fewer operations or additional operations. In addition, two or more operations may be combined and/or the order of the operations may be changed.

Figure 2:
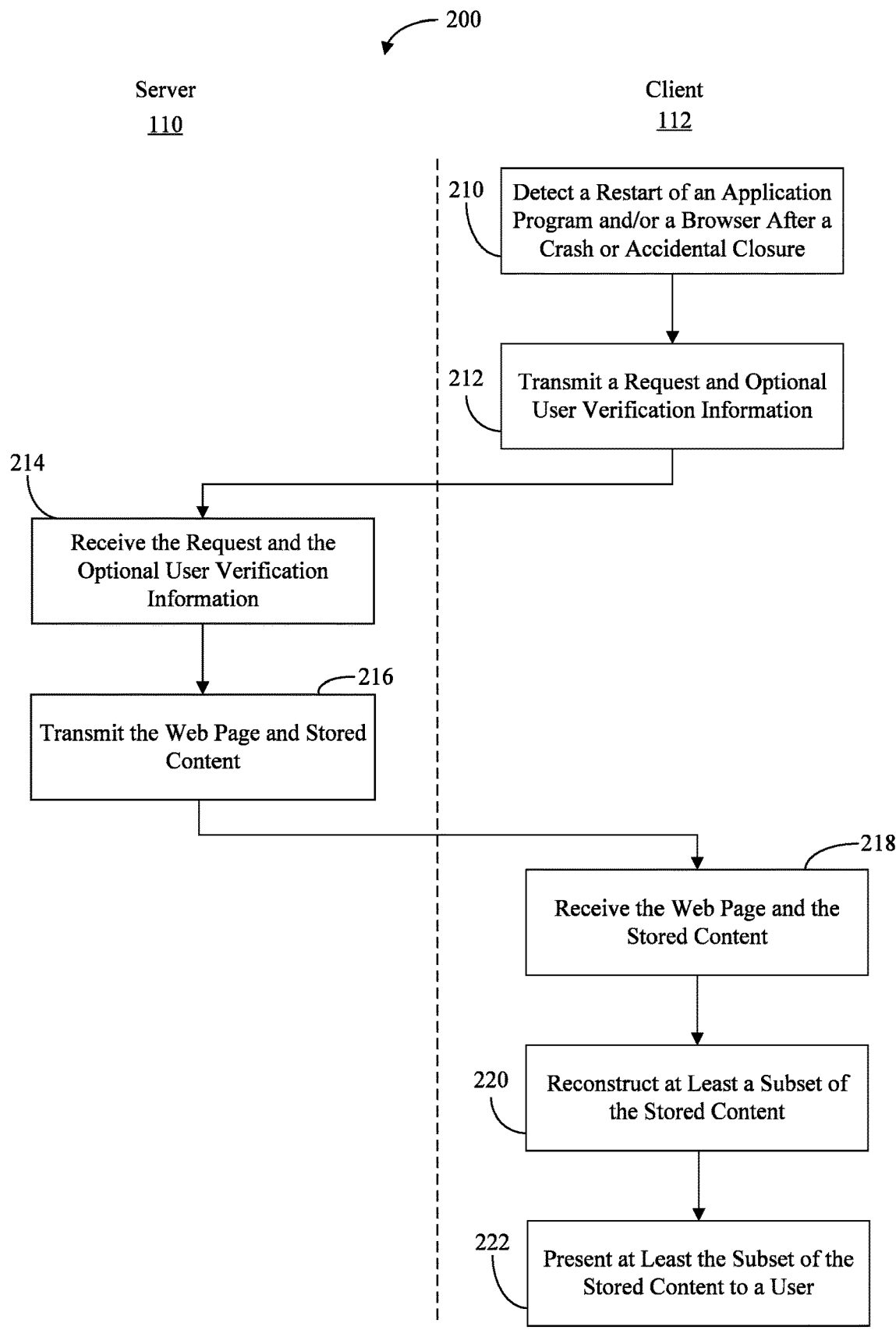
FIG. 2 is a flow diagram illustrating an embodiment of interaction between a client and a server.

FIG. 2 is a flow diagram illustrating an embodiment of a method 200 of recovering archived information. A restart of an application program and/or a browser after a crash or accidental closure is detected (210). A web page is requested (212) by a user of the client computer 112. User verification information is optionally transmitted by the client 112 to the server 110 along with the web page request (212). The verification information may help prevent one user from accessing content, such as that stored in one or more archive files, corresponding to another user. The verification information may include a user name and/or a user password. The server 110 receives a request for the web page and stored content, as well as optional user verification information (214). The server 110 transmits the web page, including the embedded archiving tool, and the stored content (216). The client 112 receives the web page and the stored content (218).

In some embodiments the restart condition is detected by the embedded archiving tool, for example, by detecting an existence of one or more cookie files on the client 112 that contain stored or archived content. In other embodiments, the restart condition is detected by the server, either by the existence of one or more archive files on the server 110 and/or by sending a request to the client 112 for cookie files corresponding to a particular URL. In the latter case, if the client 112 responds by sending cookie files with archived content, a restart condition is detected. It should be noted that in embodiments in which the restart condition is detected by the server 110, a cookie request (if any) would typically be sent to the client 112 prior to sending the web page to the client 112.

Once a restart condition is detected, at least a subset of the content stored in the one or more cookie files and/or one or more archive files is reconstructed (220) and presented (222) to the user in the context of the web page. In embodiments in which the restart condition is detected by the embedded archiving tool, the reconstructed content is inserted into one or more fields of the web page by the archiving tool. In embodiments in which the restart condition is detected by the server 110, the reconstructed content is inserted by the server 110 into one or more fields of the web page prior to sending the web page to the client 110. The archived information recovery method 200 may include fewer operations or additional operations. In addition, two or more operations may be combined and/or the order of the operations may be changed.

Figure 3:
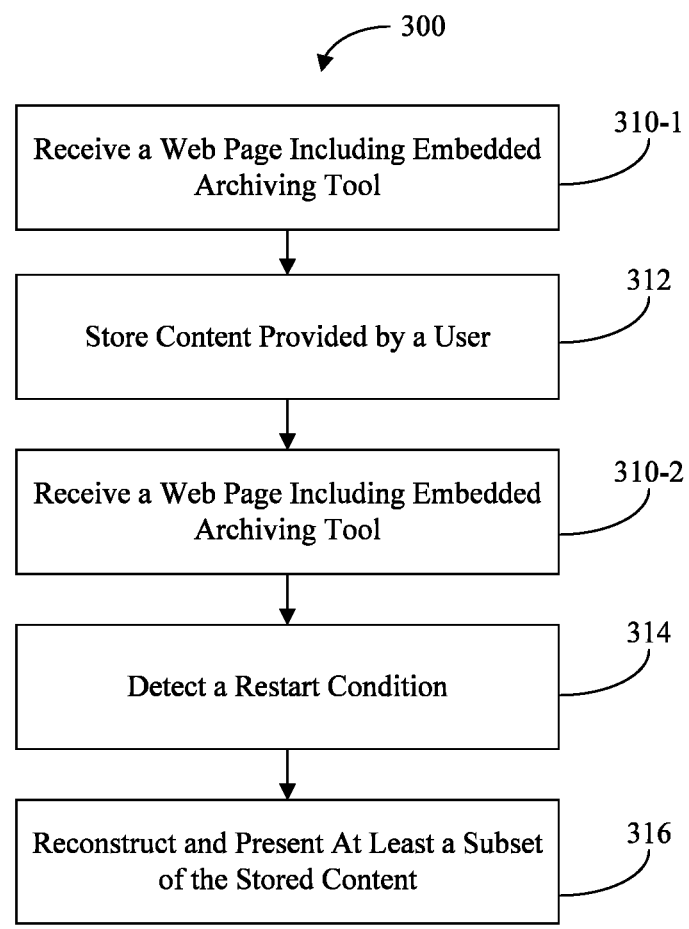
FIG. 3 is a flow diagram illustrating an embodiment of a method of restoring content.

FIG. 3 is a flow diagram illustrating an embodiment of a method 300 of restoring archived information or content. A web page including an embedded archiving tool is received (310-1). Content provided by a user is stored (312). The stored content may include information that was previously transmitted (on one or more occasions) from the client 112 (FIGS. 1 and 2) to the server 110 (FIGS. 1 and 2). A web page including an embedded archiving tool is received (310-2). For example, the user may request that the web page be down loaded again after a network failure. A restart condition is detected (314). A restart condition is detected by detecting an existence of one or more cookie files and/or one or more archive files that contain stored content. At least a subset of the stored content is reconstructed and presented (316). The subset of the stored content may be presented in the web page. In other embodiments, the archived information recovery method 300 may include fewer operations or additional operations. In addition, two or more operations may be combined and/or the order of the operations may be changed.

Figure 4:
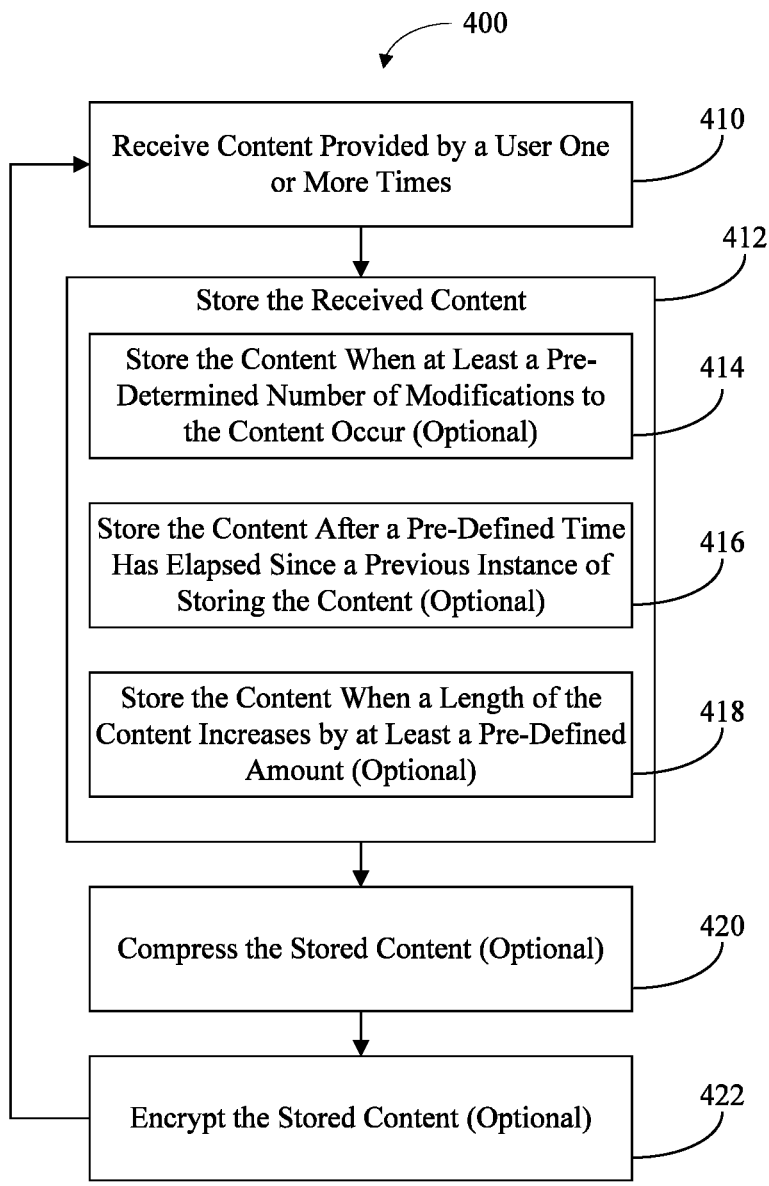
FIG. 4 is a flow diagram illustrating an embodiment of a method of storing content.

FIG. 4 is a flow diagram illustrating an embodiment of a method 500 of storing content. The method may be performed by a client computer and/or a server computer. In some embodiments, portions of the method may be performed at a server while other portions are performed at a client computer. Content provided by a user is received one or more times (410). For example, the content may be received by a web page having one or more fields for accepting user entered content, and the content may also be received by an archiving tool embedded in the web page or otherwise executing on the client computer. The received content is stored (412), for instance in one, two or more cookie files. The times at which the received content is stored may vary from one embodiment to another. For instance, in some embodiments, the received content may be optionally stored when at least a pre-determined number of modifications to the content occur (414); the received content may be optionally stored after a pre-defined time has elapsed since a previous instance of storing the content (416); and/or the received content may be optionally stored when a length of the content increases by at least a pre-defined amount (418). In some embodiments, the process of periodically storing received content may enabled whenever the user has entered new content into the web page or has modified previously entered content in the web page. Optionally, the stored content may be compressed (420) and/or encrypted (422). The method of storing content 500 may include fewer operations or additional operations. In addition, two or more operations may be combined and/or the order of the operations may be changed.

Figure 5A:
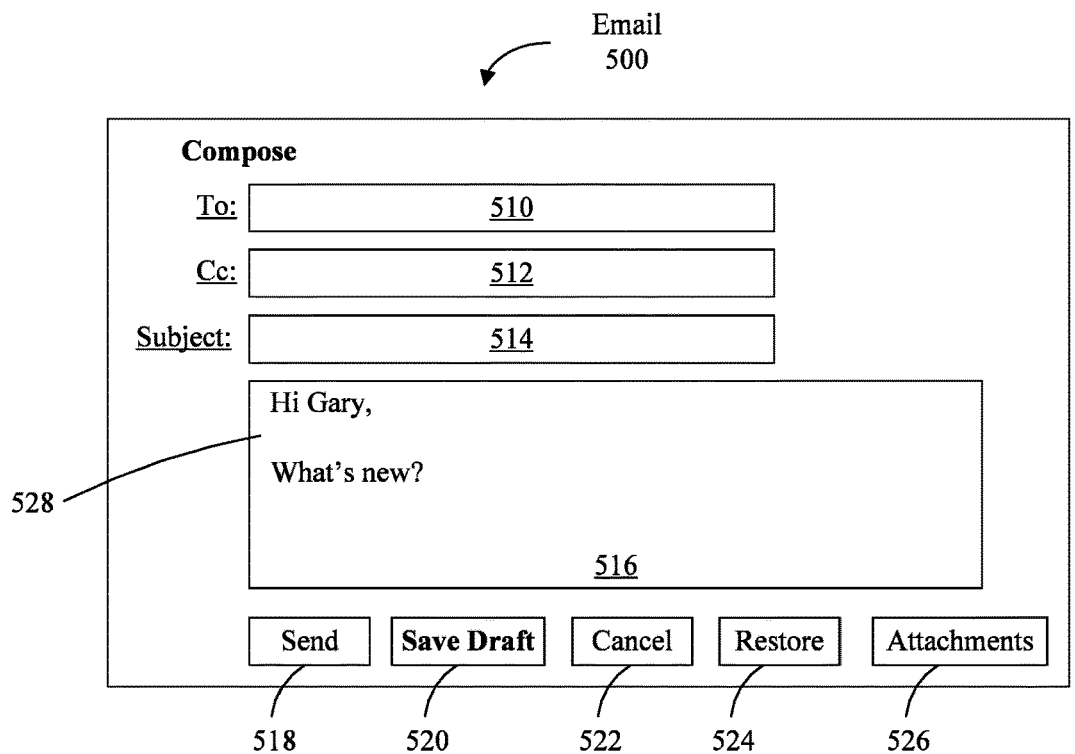
FIG. 5A is a block diagram illustrating a message composition form or page of an email application program.

Attention is now directed towards user interfaces that may be utilized in some embodiments of an embedded archiving tool for backing up user-provided data. FIG. 5A is a block diagram illustrating a message composition form or page of an email application program 500. The form may be implemented as a web page rendered by a browser or other program at a client computer. Message composition form 500 illustrates a user-entry window for composing an email message, include an addressee field 510, a "cc field" 512 for identifying one or more individuals or email addresses to be copied, a subject field 514 and a body field 516. The user-entry window includes multiple control icons, including a send icon 518, a save draft icon 520, a cancel icon 522, a restore icon 524 and/or an attachments icon 526. If there are modifications to content, such as the content 528, that are not stored on the server and/or the client computer, the save draft icon 518 may be highlighted. The highlighting may be removed whenever the content is stored on the client computer and/or the server, for example, if the user activates the save draft icon 520.

Whenever content from the user is automatically saved, a message, such as "Draft autosaved at 10.15.32 AM" may be displayed. In some embodiments, the save draft icon 520 may be temporarily disabled following an instance of storing the content 528. In these embodiments, the save draft icon 520 may be temporarily grayed out. If additional changes are made to the content 528, the save draft icon 520 may be enabled again and its original color may be restored. In some embodiments, a comparison is made between a local stored copy of the content and the content 528 when a reply from the server that confirms that the content 528 has been stored. If the two are equivalent then the save draft icon 520 may be disabled and/or grayed out. In this way, changes to the content 528 that occur after the save draft icon 520 has been activated but before a confirmation reply from the server is received may be identified. If such as change is found, the save draft icon 520 may not be disabled and/or grayed out.

If the user activates the send icon 518 or the cancel icon 522, the one or more archive files, such as one or more cookie files, may be deleted, erased or overwritten on the server and/or the client computer. If the user activates the save draft icon 520, one or more archive files corresponding to content in one or more fields, such as the content 528 in the body field 516, may be created. Alternatively, the one or more archive files may be created (e.g., by the archiving tool describe above) as content is provided or changed, or at pre-determined time intervals while content is being entered or changed by the user. If the user actives the restore icon 524, the content stored in the one or more archive files may be reconstructed and presented. The content stored in the one or more archive files may be reconstructed (e.g., by a reconstruction module) and presented if the email application program 500 is restarted before the user activates the send icon 518 or the cancel icon 522. In some embodiments, the restore icon 524 may be highlighted in the event that the restart condition is detected, such as by the existence of the one or more archive files.

Figure 5B:
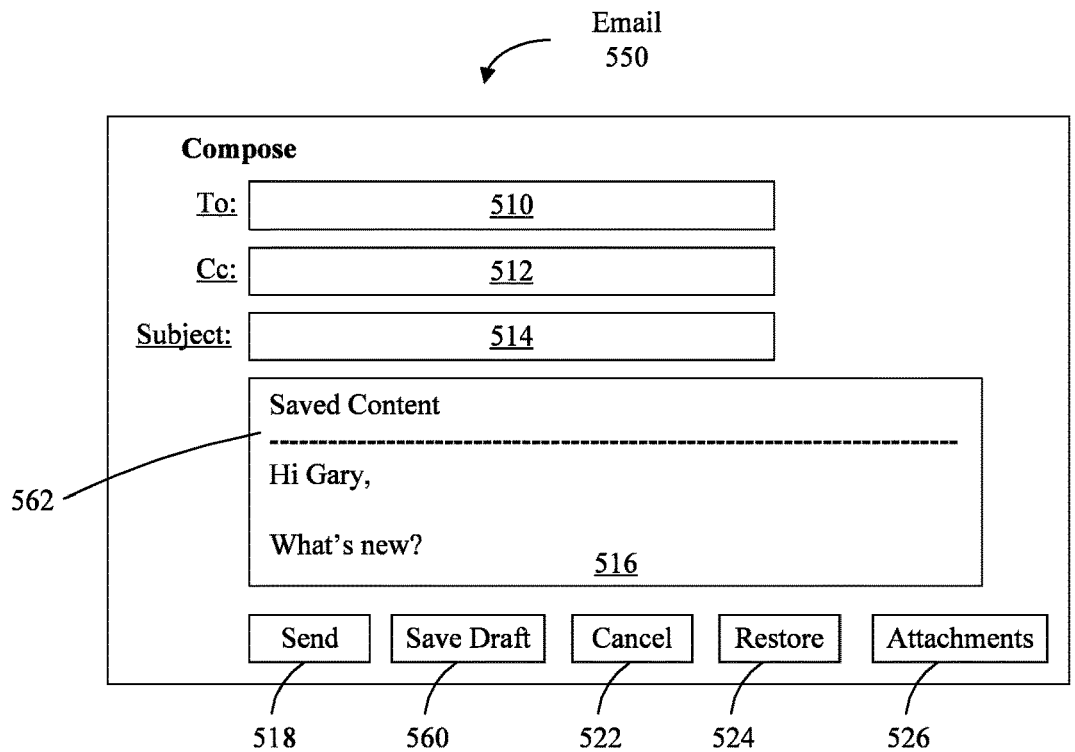
FIG. 5B is a block diagram illustrating a message composition form or page of an email application program.

FIG. 5B is a block diagram illustrating a message composition form or page of an email application program 550. Content 562 in the body field 516 includes a content-saved message that is displayed when a user restarts the browser and/or the application program following a crash or accidental closure of the browser and/or the application program.

Figure 6:
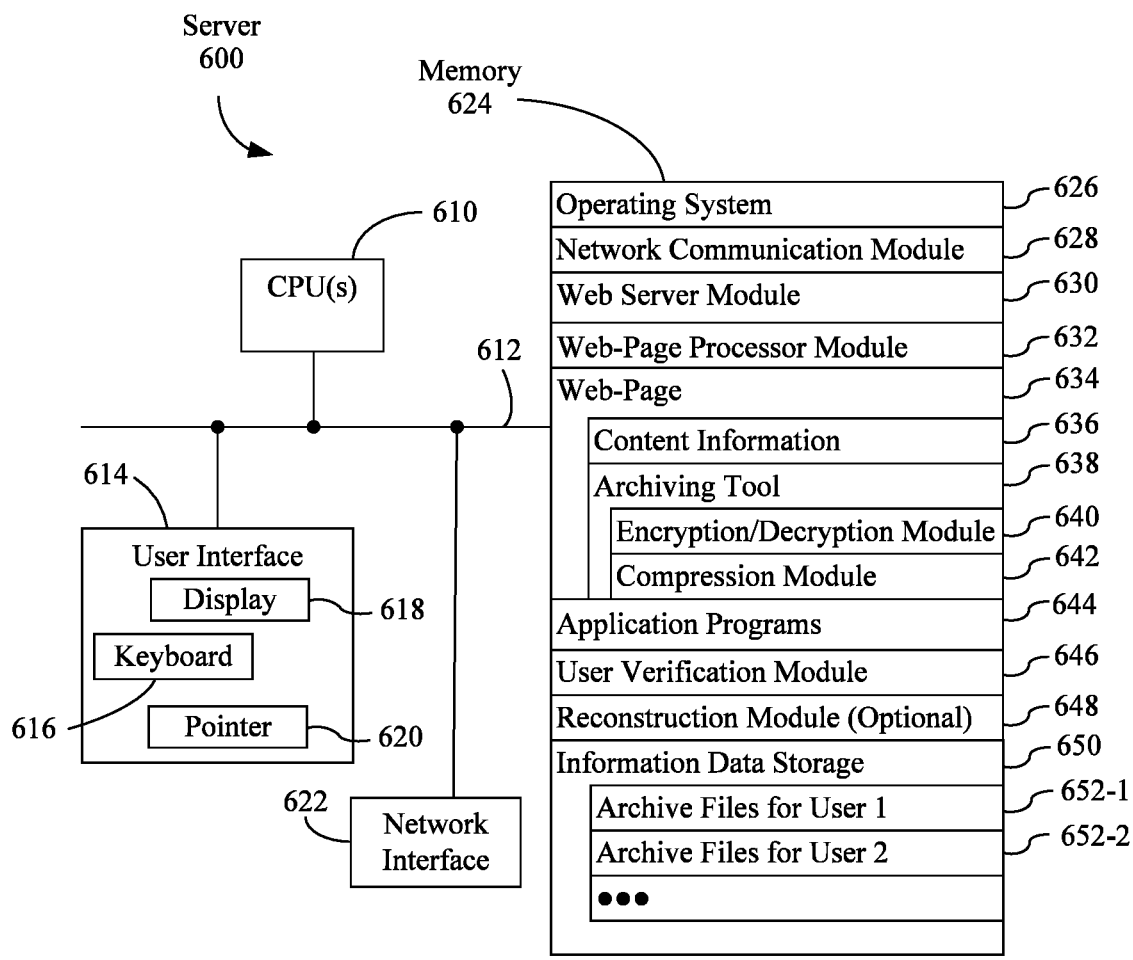
FIG. 6 is a block diagram illustrating an embodiment of a server.

Attention is now given to hardware and systems that may utilize and/or implement the embodiments of the embedded archiving tool, such as methods 100, 200, 300 or 400, discussed above. FIG. 6 is a block diagram illustrating an embodiment of a server 600.

The server 600 may include at least one data processor or central processing unit (CPU) 610, one or more optional user interfaces 614, a communications or network interface 622 for communicating with other computers, servers and/or clients, memory 624, and one or more signal lines or communication busses 612 for coupling these components to one another. The user interface 614 may include a display 618, a keyboard 616 and/or a pointer 620, such as a mouse, trackball or touch sensitive pad.

Memory 624 may include high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 624 may optionally include one or more storage devices remotely located from the CPU(s) 610. Memory 624 may store an operating system 626, such as LINUX, UNIX or WINDOWS, that includes procedures (or a set of instructions) for handling basic system services and for performing hardware dependent tasks. Memory 624 may also store communication procedures (or a set of instructions) in a network communication module 628. The communication procedures are used for communicating with clients, such as the client 112 (FIG. 1), and with other servers and computers.

Memory 624 may also store a web server module (or a set of instructions) 630, a web-page processor module (or a set of instructions) 632, a web page 634, one or more application programs (or sets of instructions) 644, a user verification module (or a set of instructions) 646, an optional reconstruction module (or a set of instructions) 648, and information data storage 650. The web page 634 may include content information 636 and an archiving tool (or a set of instructions) 638. The archiving tool 638 may optionally include encryption/decryption module (or a set of instructions) 640 and may optionally include a compression module (or a set of instructions) 642. The information data storage 650 may include archive data files 652 for one or more users. The reconstruction module 648 may be used to restore content, using information stored in one or more archive files, when a restart condition is detected.

Although FIG. 6 shows the server 600 as a number of discrete items, FIG. 6 is intended more as a functional description of the various features which may be present in the server 600 rather than as a structural schematic of the embodiments described herein. In practice, and as recognized by those of ordinary skill in the art, the functions of the server 600 may be distributed over a number of servers or computers, with various groups of the servers performing particular subsets of those functions. Items shown separately in FIG. 6 could be combined and some items could be separated. For example, some items shown separately in FIG. 6 could be implemented on single servers and single items could be implemented by one or more servers. The actual number of servers and how features are allocated among them will vary from one implementation to another, and may depend in part on the amount of information stored by the server 600 and/or the amount data traffic that the server 600 must handle during peak usage periods as well as during average usage periods.

Figure 7:
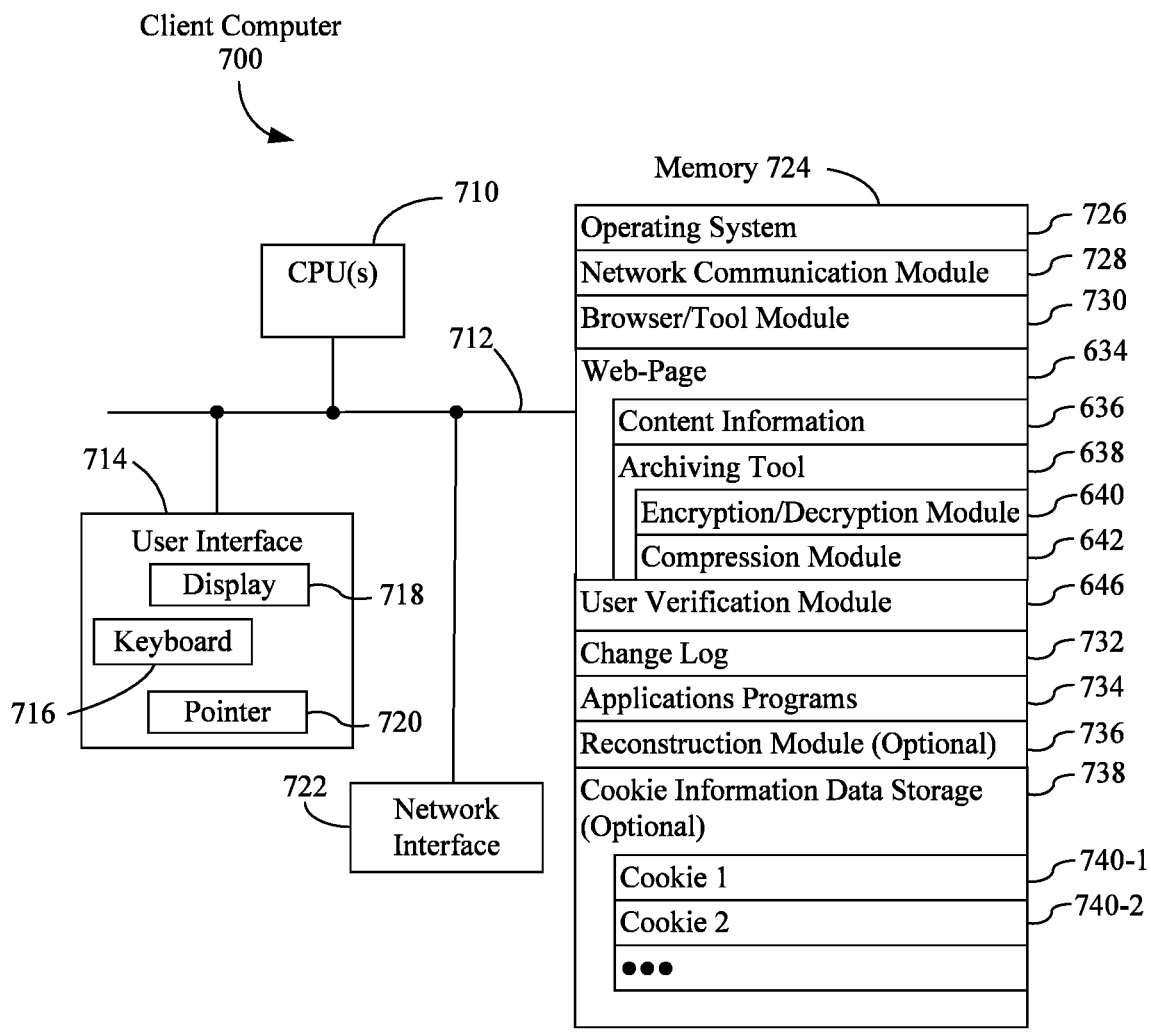
FIG. 7 is a block diagram illustrating an embodiment of a client computer.

FIG. 7 is a block diagram illustrating an embodiment of a client computer or device 700. The client computer or device 700 includes at least one data processor or central processing unit (CPU) 710, one or more optional user interfaces 714, a communications or network interface 722 for communicating with other computers, servers and/or clients, memory 724 and one or more signal lines and/or communication busses 712 for coupling these components to one another. The user interface 714 may have one or more keyboards 716, a pointer device 720 such as mouse, trackball or touch sensitive pad, and/or one or more displays 718.

Memory 724 may include high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 724 may optionally include one or more storage devices remotely located from the CPU(s) 710. Memory 724 may store an operating system 726, such as LINUX, UNIX or WINDOWS, that includes procedures (or a set of instructions) for handling basic system services and for performing hardware dependent tasks. Memory 724 may also store communication procedures (or a set of instructions) in a network communication module 728. The communication procedures are used for communicating with the server 600 (FIG. 6) or any specified website or URL accessible to the client computer or device 700.

Memory 724 may also include a browser or browser tool module 730 (or a set of instructions). The browser 730 may be used to render various web pages, including a web page having an embedded web-page archiving tool. As discussed elsewhere in this document, the web-page archiving tool may be embedded in one or more web pages received from a remote server and rendered by the browser or browser tool module 730. In some clients, the browser 730 may render the web page 634. The web page 634 may include the content information 636 and the archiving tool (or a set of instructions) 638. The archiving tool 638 may optionally include an encryption/decryption module (or a set of instructions) 640 and may optionally include a compression module (or a set of instructions) 642.

Memory 724 may also include an optional user verification module (or a set of instructions) 646, an optional change log 732, one or more applications programs (or a set of instructions) 734, an optional reconstruction module (or a set of instructions) 736, and cookie information data storage 738. The cookie information data storage 738 may include one or more cookies 740. The change log 732 may be used to track changes to the one or more stored archive files, such as cookies 740-1 and 740-2, and/or to roll-back a recent change to the content, i.e., to restore a previously stored version of the content. For instance, the change log 732 may include multiple entries, each having a time stamp, a cookie file name or identifier, and optionally information indicating content changes associated with the change log entry. The reconstruction module 736 may be used to restore content, using information stored in one or more archive files, when a restart condition is detected.

In embodiments where the client computer or device 700 is coupled to the server 600 (FIG. 6), one or more of the modules and/or applications in memory 724 may be stored in the server 600 (FIG. 6) at a different location than the user. In particular, in some embodiments the web-page 634, including the content information 636 and the archiving tool 638, and/or the user verification module 646 may be contained in either the server 600 (FIG. 6) and/or the client computer or device 700. Similarly, the reconstruction module 736 may be located at the server 600 instead of the client computer or device 700, in which case reconstruction of the user entered content is performed at the server 600 based on user provided content (if any) saved at the server and user provided content in cookie files retrieved from the client computer or device 700 and/or archive files in the server 600 (FIG. 6).

Each of the above identified modules and applications corresponds to a set of instructions for performing one or more functions described above. These modules (i.e., sets of instructions) need not be implemented as separate software programs, procedures or modules. The various modules and sub-modules may be rearranged and/or combined. Memory 724 may include additional modules and/or sub-modules, or fewer modules and/or sub-modules. Memory 724, therefore, may include a subset or a superset of the above identified modules and/or sub-modules.

Figure 8:
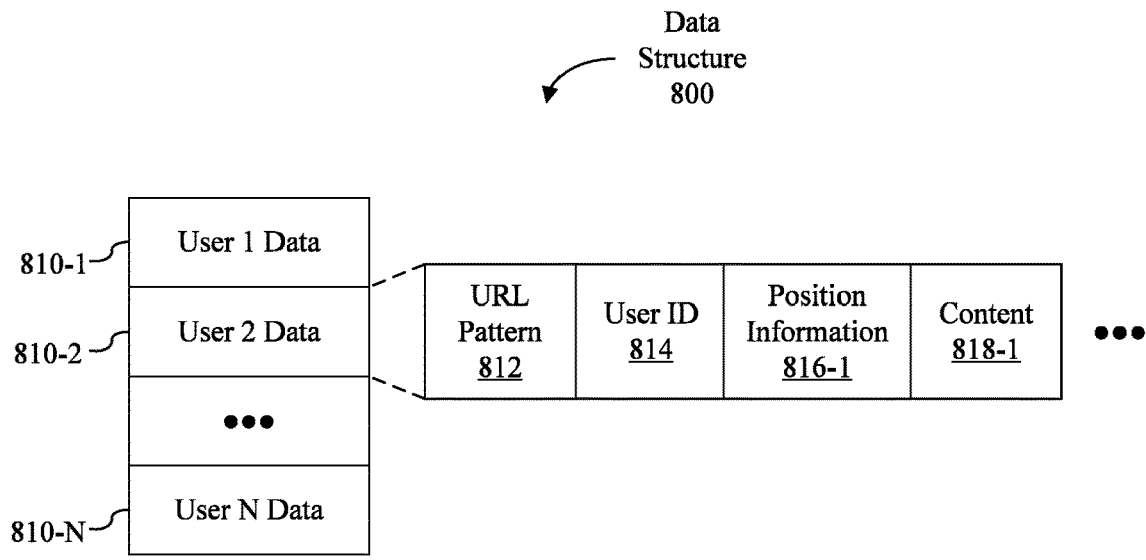
FIG. 8 is a block diagram illustrating an embodiment of a server data structure.

Attention is now given to data structures that may be utilized in conjunction with the embedded archiving tool and the related hardware discussed above. FIG. 8 is a block diagram illustrating an embodiment of a server data structure 800. The data structure 800 may include a plurality of archive files 810 that include user data. A respective archive file, such as archive file 810-2, may include a URL pattern 812, a user ID 814, and one or more pairs of data. A respective pair of data may include position information 816-1 and content 818-1. In some embodiments, the data structure 800 may include fewer or additional elements, two or more elements may be combined, and/or a position of one or more elements may be changed.

Figure 9:
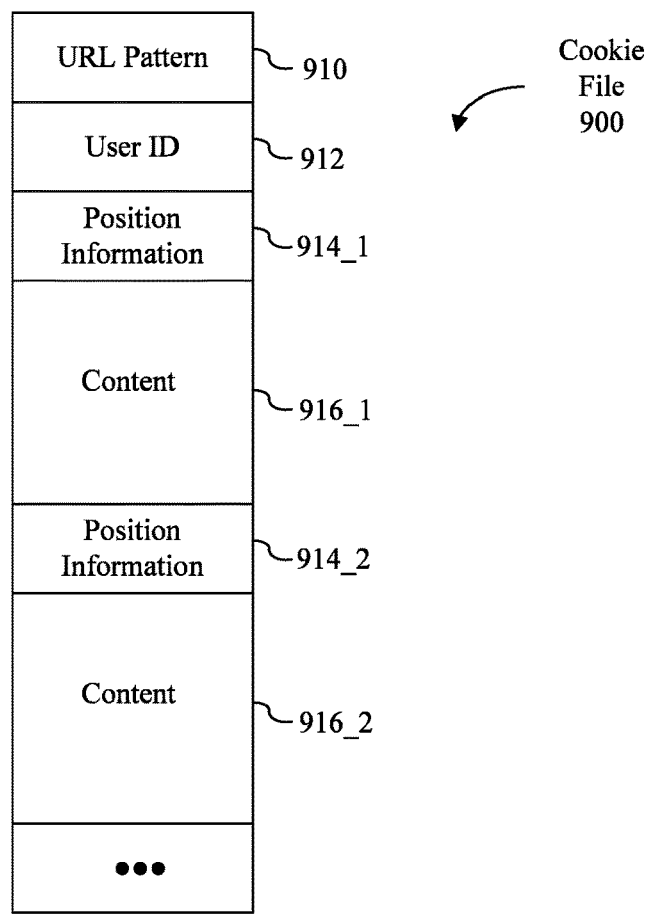
FIG. 9 is a block diagram illustrating an embodiment of a cookie file.

FIG. 9 is a block diagram illustrating an embodiment of a cookie file 900, which may be stored on a client computer and/or a server. The cookie file 900 may include multiple entries, including a URL pattern 910, a user identification 912, and/or one or more entries including position information (for example, for a respective field in a web page or window) 914 and content 916. The cookie file 900 may also include one or more time stamps corresponding to the content 916 and/or one or more name (or attribute)-value pairs. In some embodiments, the cookie file 900 may include fewer or additional elements, two or more elements may be combined, and/or a position of one or more elements may be changed.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method performed by a host system having one or more processors, the method comprising:
   sending, by the one or more processors, first information to a client system via a communication network, the first information including content of a structured document and an embedded archiving tool;
   automatically receiving, by the one or more processors, one or more inputs from the client system via the communication network, the one or more inputs including user-edited information for the structured document;
   in response to automatically receiving the one or more inputs, making one or more changes to a backup copy to second information stored by the host system;
   determining, by the one or more processors, an unintended restart condition for the structured document; and
   in response to determining the unintended restart condition for the structured document, sending at least a portion of the backup copy to the client system.

2. The method of claim 1, wherein the unintended restart condition is a crash or accidental closure of the structured document.

3. The method of claim 1, wherein determining the unintended restart condition includes performing a recovery process, the recovery process including receiving a request from the client system to provide information from the backup copy to the client system.

4. The method of claim 3, wherein the recovery process further includes verifying a user associated with the backup copy.

5. The method of claim 1, wherein determining the unintended restart condition for the structured document is based on detecting a restart condition.

6. The method of claim 5, wherein the restart condition is detected by the host system.

7. The method of claim 6, wherein the restart condition is detected by the host system based on an existence of one or more archive files stored by the host system.

8. The method of claim 6, wherein the restart condition is detected by the host system by sending a request to the client system for information corresponding to a particular identifier associated with the structured document.

9. The method of claim 1, wherein the structured document is a web page.

10. The method of claim 9, wherein the embedded archiving tool is embedded in web page instructions of the first information.

11. The method of claim 9, wherein the embedded archiving tool is configured to archive content provided by a user to an application program via the web page.

12. The method of claim 11, wherein the application program is selected from the group consisting of an email application, a text processor, a spread sheet application, a presentation authoring tool, a blog authoring tool, a web page-based form for entering information to be stored in a server, a web-page authoring tool, and an advertising program registration tool.

13. The method of claim 9, wherein sending at least the portion of the backup copy to the client system includes inserting restructured content into one or more fields of the structured document.

14. The method of claim 1, wherein the embedded archiving tool is configured to archive content provided by a user when an archiving condition is satisfied.

15. The method of claim 14, wherein the archiving condition is at least one of: when at least a pre-determined number of modifications to content have occurred, when a length of the content increases by at least a pre-defined amount, when an application program is closed, or when a web browser is closed.

16. A host system comprising:
   memory configured to store first information, the first information including content of a structured document and an embedded archiving tool; and
   one or more processors operatively coupled to the memory, the one or more processors being configured to:
      send the first information to a client system via a communication network;
      automatically receive one or more inputs from the client system via the communication network, the one or more inputs including user-edited information for the structured document;
      in response to automatically receiving the one or more inputs, make one or more changes to a backup copy to second information stored by the host system;
      determine an unintended restart condition for the structured document; and
      in response to determining the unintended restart condition for the structured document, send at least a portion of the backup copy to the client system.

17. The host system of claim 16, wherein determination of the unintended restart condition includes performing a recovery process, the recovery process including receiving a request from the client system to provide information from the backup copy to the client system.

18. The host system of claim 16, wherein determination of the unintended restart condition for the structured document is based on detecting a restart condition.

19. A non-transitory computer-readable storage medium having instructions stored thereon, the instructions, when executed by one or more processors, causing the one or more processors to perform a method comprising:
   sending first information to a client system via a communication network, the first information including content of a structured document and an embedded archiving tool;
   automatically receiving one or more inputs from the client system via the communication network, the one or more inputs including user-edited information for the structured document;
   in response to automatically receiving the one or more inputs, making one or more changes to a backup copy to second information stored by the host system;
   determining an unintended restart condition for the structured document; and
   in response to determining the unintended restart condition for the structured document, sending at least a portion of the backup copy to the client system.

20. The non-transitory computer-readable storage medium of claim 19, wherein determining the unintended restart condition either:

includes performing a recovery process including receiving a request from the client system to provide information from the backup copy to the client system; or is based on detecting a restart condition.

* * * * *

UNITED STATES PATENT AND TRADEMARK OFFICE
CERTIFICATE OF CORRECTION

PATENT NO. : 10,897,501 B2
APPLICATION NO. : 16/458683
DATED : January 19, 2021
INVENTOR(S) : Darick M. Tong It is certified that error appears in the above-identified patent and that said Letters Patent is hereby corrected as shown below:

In the Claims

Claim 19, Column 14, Line 59:
Now reads: "the host system"; should read -- a host system --

Signed and Sealed this
Twenty-seventh Day of September, 2022

Katherine Kelly Vidal
*Director of the United States Patent and Trademark Office*